United States Patent
Nortes Cano

(10) Patent No.: US 10,625,672 B2
(45) Date of Patent: Apr. 21, 2020

(54) REFLECTIVE, SELF-SUPPORTING ROAD SIGNALING DEVICE

(71) Applicant: Leonardo Nortes Cano, Murica (ES)

(72) Inventor: Leonardo Nortes Cano, Murica (ES)

(*) Notice: Subject to any disclaimer, the term of this patent is extended or adjusted under 35 U.S.C. 154(b) by 0 days.

(21) Appl. No.: 15/579,853

(22) PCT Filed: Jun. 22, 2016

(86) PCT No.: PCT/ES2016/000071
§ 371 (c)(1),
(2) Date: Dec. 5, 2017

(87) PCT Pub. No.: WO2017/220821
PCT Pub. Date: Dec. 28, 2017

(65) Prior Publication Data
US 2019/0291638 A1    Sep. 26, 2019

(51) Int. Cl.
   *B60Q 7/00* (2006.01)
   *G09F 3/20* (2006.01)
   *B60Q 1/26* (2006.01)
   *B60Q 1/32* (2006.01)

(52) U.S. Cl.
   CPC .............. *B60Q 7/005* (2013.01); *B60Q 1/26* (2013.01); *B60Q 1/32* (2013.01); *B60Q 7/00* (2013.01); *G09F 3/203* (2013.01)

(58) Field of Classification Search
   CPC ............. G09F 3/203; G09F 2017/0075; G09F 2007/1865; B60Q 7/005
   See application file for complete search history.

(56) References Cited

U.S. PATENT DOCUMENTS

| | | |
|---|---|---|
| 3,903,629 A | 9/1975 | Gruna |
| 3,975,849 A | 8/1976 | Tuleja |
| 4,650,147 A | 3/1987 | Griffin |
| 5,062,380 A * | 11/1991 | Chestnutt ............... G09F 21/04 116/175 |
| 5,463,974 A * | 11/1995 | Seeder ..................... G09F 7/18 116/173 |
| 7,992,333 B1 * | 8/2011 | McGuinness ............. G09F 3/16 116/28 R |
| 9,368,050 B2 * | 6/2016 | Bigham ................. G09F 17/00 |

FOREIGN PATENT DOCUMENTS

| | | |
|---|---|---|
| ES | 1009398 U | 8/1989 |
| FR | 2 690 885 A1 | 11/1993 |
| GB | 1169589 A | 11/1969 |

OTHER PUBLICATIONS

Notification Concerning Transmittal of International Preliminary Report on Patentability dated Jan. 3, 2019, in connection with corresponding International Application No. PCT/ES2016/000071 (16 pgs.).

* cited by examiner

*Primary Examiner* — Kristina N Junge
(74) *Attorney, Agent, or Firm* — Maier & Maier, PLLC

(57) ABSTRACT

Reflective, self-supporting road signaling device comprised of a support piece (A) and a signaling plate (B). The support piece (A) is made of a rigid triangular element with a clamp fastening onto the upper part of a vehicle window to support the signaling plate (B). As for the signaling plate (B), it is comprised of a long rectangular piece with a large positioning area for the reflective element (8). To ensure the signposted vehicle is easily seen by traffic on its same side, a reflective arrow changing color between red and white, with the arrow vertex as far as possible from the vehicle that carries it, is used.

3 Claims, 2 Drawing Sheets

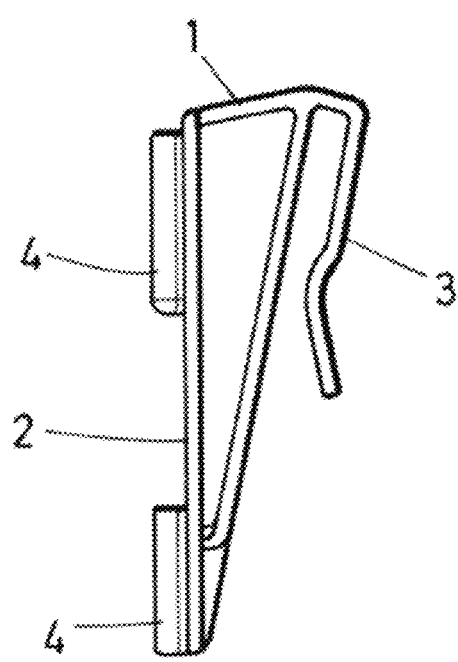
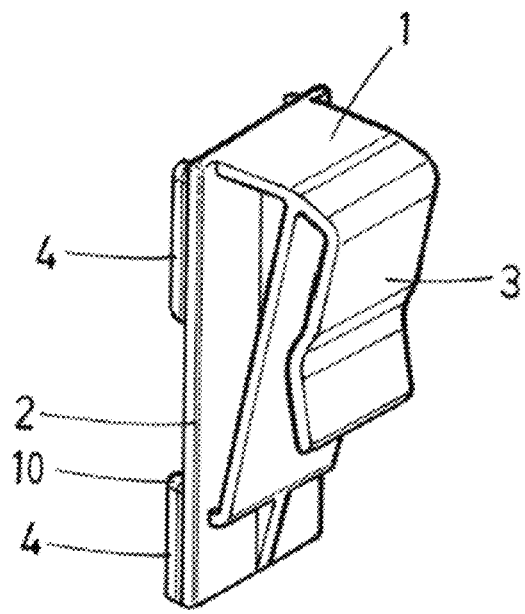

REFLECTIVE, SELF-SUPPORTING ROAD SIGNALING DEVICE

FIELD

This invention refers to a reflective, self-supporting road signaling device which can be placed on a vehicle without getting out of it, thus preventing the danger of stepping out onto a narrow road or under poor visibility or adverse weather conditions.

This invention is aimed at the auxiliary automotive industry and the manufacturing sector of small extrusion parts in light metal or plastic.

BACKGROUND

It is currently mandatory to use a traffic sign comprised of a triangular bracket which is placed on the road at a certain distance from the stationary vehicle.

This device is hardly visible from afar, at night or under conditions of rain, fog or poor visibility.

Placing this device implies the user needs to get out of the stationary vehicle, regardless of road or/and weather conditions.

Furthermore, the device does not inform on the requirement to keep enough distance when overtaking a stationary or broken down vehicle on the road.

These lacks can result in really dangerous situations for the life and physical integrity of the user, in addition to leading to severe accidents which could be avoided if a different device were used.

As background information, the inventor knows utility model ES1009398U, which has a similar purpose to our invention but differs from it due to its complex, unpractical lighting system.

Besides, model ES1009398U does not favor compliance with the obligation to keep enough distance when overtaking a stationary or broken down vehicle because it is designed to be placed on top of the vehicle.

SUMMARY

The proposed invention has specific features which improve the state-of-the-art while maintaining the intended purpose. This is achieved by means of a simplified construction and assembly structure, with only two parts interlocking to form the complete traffic sign. This device has no legs, no added complex support elements and no connections to external power sources.

This is a reflective, self-supporting, independent device which is connected to the upper part of a vehicle's window by means of a clamp or magnetically attached to the vehicle when this is stopped on the hard shoulder.

The sign is comprised of a "flexible" metal or plastic bracket (e.g. ABS) to prevent vehicle damage in case of impact. Aesthetically, it looks like a reflective arrow which alternates color between red and white, with the arrow vertex as far as possible from the vehicle carrying it.

In addition to the arrow design, it is also possible to offer a rectangular design with inner arrow-shaped reflective bands alternating from red to white, forming a 90° angle between them to indicate direction.

The sign should be placed facing oncoming vehicle traffic, informing on the obligation to keep enough distance when overtaking the stationary or broken down vehicle. The triangle currently in use does not inform on the need to move away from vehicles broken down or stopped on the road.

The traffic warning plate, compatible with the legally mandatory triangle, has the advantage that it is much more visible from afar, as well as at night or under conditions of rain, fog or poor visibility.

BRIEF DESCRIPTION OF DRAWINGS

To complement the description provided and to favor better understanding of invention features, a part of this description is comprised of a set of diagrams illustrating, but not limited to, the following things:

FIG. 1.—Side view of the device bracket.
FIG. 2.—Isometric view of the device bracket.

DETAILED DESCRIPTION

Figure 3:
FIG. 3.—Side view of the sign adaptable to the device bracket.
Figure 4:
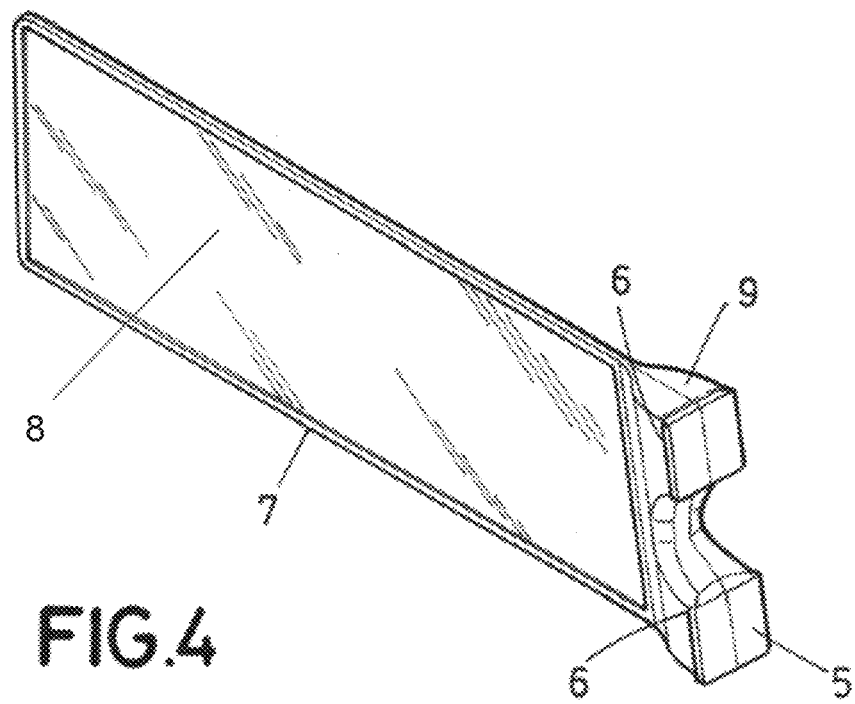
FIG. 4.—Perspective view of the sign adaptable to the device bracket.

This invention refers to a reflective, self-supporting road signaling device which can be placed on a vehicle without getting out of it, thus preventing the danger of stepping out onto narrow or wide roads or under poor visibility or adverse weather conditions.

As part of the preferred embodiment of this invention, the reflective, self-supporting road signaling device is comprised of two key elements:

(A).—Support piece,
(B).—Signaling plate.

The support piece (A) is comprised of a rigid triangular element (1) of about (not restrictive) 10 cm in width and 3 mm in thickness. The main side (2) has two square attachment parts (4) comprised of two flat sides with L-shaped lips (10) on the side and lower rods where the attachment parts (4) of the signaling plate (B) will be located.

As an upper side extension of the rigid triangular element (1) and with the same thickness and density material as the upper side, there is a fastening clamp (3) defined by three planes. The first plane is parallel to the upper side of the rigid triangular element (1). The second plane is a continuation of the previous one but in a slightly vertical plane running parallel to the inclined plane of the rigid triangular element (1). As for third and last plane, it is a continuation of the previous plane and forms a slight curve later diverting some 30° from the inclined plane of the rigid triangular element (1) towards the outside.

These three planes comprise a clamp (3) which fastens onto the upper part of a vehicle window to serve as support for the signaling plate (B).

The signaling plate (B) is made of a long rectangular piece with reduced thickness (some 3 mm) and a light, resistant material (e.g. ABS or aluminum) called support piece (7). There is a large positioning area for the reflective element (8) on both sides of the support piece surfaces.

One side end of the support piece (7) has a widening (9) which bears two bolsters (5) on its upper and lower parts. The bolsters have vertical and parallel flanges (6) with a size enabling these parts to slide inside the attachment parts (5) and maintain the signaling plate (B) in its operational position.

Reflective elements (8) can have identical or different signaling on both sides. That would allow different information to be provided to incoming traffic on both sides of the vehicle. For traffic on the same side as the signposted vehicle, a reflective arrow changing color between red to white, with the arrow vertex as far as possible from the vehicle that carries it, is used.

The sign should be placed facing oncoming vehicle traffic, informing on the obligation to keep enough distance when overtaking the stationary or broken down vehicle. The triangle currently in use does not inform on the need to move away from vehicles broken down or stopped on the road.

In another preferred embodiment, the lip (3) is comprised of magnetic or magnetizable material so that it can be attached not only to the upper window part, but anywhere on the vehicle body, thus increasing invention versatility.

In another preferred embodiment the idea is to have the support piece (A) and signaling plate (B) being part of the same monoblock part (not removable).

After sufficiently describing the nature of this invention and its practical application, it is important to mention that the layout presented and represented in the drawings could undergo detail changing provided it does not alter the main principle summarized in the following claims.

The invention claimed is:

1. A reflective, self-supporting road signaling device comprising:
    a support piece and a signaling plate;
    the support piece comprising a rigid triangular element and a clamp for fastening onto a vehicle window;
    the rigid triangular element comprising a main side, an upper side and an inclined plane both extending from a first face of the main side, and two square attachment parts extending from a second face of the main side, each square attachment part having two flat sides with L-shaped lips placed in a vertical and parallel manner;
    the clamp extending from the upper side of the rigid triangular element and having the same width as the upper side of the triangular element, the clamp being defined by a first plane, a second plane, and a third plane;
    the first plane extending from the vertex of the upper side and the inclined plane of the rigid triangular element in a horizontal and slightly downward direction;
    the second plane continuing from the first plane but in a slightly vertical plane running parallel to the inclined plane of the rigid triangular element;
    the third plane continuing from the second plane, forming a slight curve, and then diverging about 30° from the inclined plane of the rigid triangular element;
    each of the first plane, second plane and third plane being disposed below the vertex of the upper side and the inclined plane of the rigid triangular element;
    the signaling plate comprising a long and light rectangular piece of reduced thickness, and a widened portion;
    the rectangular piece comprising a large positioning area on both surfaces for a reflective element;
    the widened portion comprising two bolsters on the upper and lower ends thereof, each bolster having vertical and parallel flanges sized so as to slide inside the attachment parts so as to maintain the signaling plate in its operational position.

2. The reflective, self-supporting road signaling device of claim 1, further comprising a printed arrow shape in alternating reflective colors, with a vertex of the arrow positioned opposite the widened portion, so as to be positioned as far as possible from the vehicle that carries the road signaling device.

3. The reflective, self-supporting road signaling device of claim 1, wherein the clamp is formed from a magnetic or magnetizable material so that the device can be attached anywhere on a vehicle body.

* * * * *